US 10,815,809 B2

(12) United States Patent
DiFrancesco et al.

(10) Patent No.: US 10,815,809 B2
(45) Date of Patent: Oct. 27, 2020

(54) GUIDED NON-CONTACT SEAL ASSEMBLY

(71) Applicant: United Technologies Corporation, Farmington, CT (US)

(72) Inventors: Michael L. DiFrancesco, Waterbury, CT (US); Conway Chuong, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 37 days.

(21) Appl. No.: 16/149,901

(22) Filed: Oct. 2, 2018

(65) Prior Publication Data
US 2020/0102845 A1    Apr. 2, 2020

(51) Int. Cl.
*F01D 11/00*    (2006.01)
*F01D 11/02*    (2006.01)

(52) U.S. Cl.
CPC .......... *F01D 11/001* (2013.01); *F01D 11/025* (2013.01); *F05D 2220/32* (2013.01); *F05D 2240/57* (2013.01); *F05D 2260/38* (2013.01)

(58) Field of Classification Search
CPC ...... F01D 11/001; F01D 11/025; F01D 11/02; F01D 11/00; F05D 2220/32; F05D 2220/321; F05D 2220/3213; F05D 2220/3215–17; F05D 2240/57; F05D 2260/38; F05D 2260/36; F05D 2260/37; F05D 2220/3212; F05D 2260/30
USPC ........................................................ 277/418
See application file for complete search history.

(56) References Cited

U.S. PATENT DOCUMENTS

| | | | |
|---|---|---|---|
| 6,250,640 B1 | 6/2001 | Wolfe et al. | |
| 10,060,535 B2* | 8/2018 | Simpson | F16J 15/447 |
| 2015/0322816 A1* | 11/2015 | Schmitz | F01D 1/04 |
| | | | 60/796 |
| 2016/0069269 A1* | 3/2016 | Hyland | F16J 15/44 |
| | | | 415/1 |
| 2016/0097294 A1* | 4/2016 | Wilson | F01D 11/001 |
| | | | 415/173.1 |
| 2016/0130963 A1* | 5/2016 | Wilson | F01D 11/001 |
| | | | 60/805 |
| 2017/0211402 A1* | 7/2017 | Peters | F01D 5/02 |
| 2017/0211406 A1* | 7/2017 | Peters | F03B 3/16 |
| 2017/0248236 A1 | 8/2017 | Simpson et al. | |

(Continued)

OTHER PUBLICATIONS

EP search report for EP19189645.5 dated Feb. 11, 2020.

*Primary Examiner* — Nathan Cumar
(74) *Attorney, Agent, or Firm* — Getz Balich LLC

(57) ABSTRACT

An outer seal structure for a rotor assembly includes a stator structure and a non-contact seal assembly. The non-contact seal assembly is fixed relative to the stator structure and includes a plurality of seal shoes, a seal base, a plurality of spring elements, and a shoe support plate. The plurality of seal shoes are arranged about an axis in an annular array. The seal base circumscribes the annular array of the plurality of seal shoes. Each of the plurality of spring elements extend radially between a respective seal shoe of the plurality of seal shoes and the seal base. The shoe support plate is arranged about the axis and mounted to the stator structure and includes a plurality of shoe support tabs extending axially from the shoe support plate. Each shoe support tab of the plurality of shoe support tabs is disposed between each seal shoe.

19 Claims, 6 Drawing Sheets

(56) References Cited

U.S. PATENT DOCUMENTS

2018/0045067 A1\* 2/2018 Chuong ................. F01D 25/24
2018/0058237 A1\* 3/2018 Wilson ...................... F01D 5/02

\* cited by examiner

GUIDED NON-CONTACT SEAL ASSEMBLY

This invention was made with Government support awarded by the United States. The Government has certain rights in this invention.

BACKGROUND

1. Technical Field

This disclosure relates generally to rotational equipment and, more particularly, to a non-contact seal assembly for rotational equipment.

2. Background Information

Rotational equipment typically includes one or more seal assemblies for sealing gaps between rotors and stators. A typical seal assembly includes a seal element such as a knife edge seal that is positioned relative to a seal land. However, such seal assemblies may be susceptible to leakage between the seal element and the seal land as a result of asymmetric deflection between the associated rotor and stator. Non-contact seals have been developed in an effort to accommodate such asymmetric deflection. However, such non-contact seals may be susceptible to clearance variations between the seal and the rotor, thereby reducing sealing effectiveness. Further, seal components may be vulnerable to buckling as a result of circumferential loads exerted on the seals (e.g., from rotor contact, windage, etc.). Accordingly, there is still room for improvement to provide an improved non-contact seal.

SUMMARY

According to an aspect of the present disclosure, an outer seal structure for a rotor assembly includes a stator structure and a non-contact seal assembly. The non-contact seal assembly is fixed relative to the stator structure. The non-contact seal assembly includes a plurality of seal shoes, a seal base, a plurality of spring elements, and a shoe support plate. The plurality of seal shoes are arranged about an axis in an annular array. The seal base circumscribes the annular array of the plurality of seal shoes. Each of the plurality of spring elements extend radially between a respective seal shoe of the plurality of seal shoes and the seal base. The shoe support plate is arranged about the axis and mounted to the stator structure. The shoe support plate includes a plurality of shoe support tabs extending axially from the shoe support plate. Each shoe support tab of the plurality of shoe support tabs is disposed between each adjacent pair of seal shoes of the plurality of seal shoes.

In the alternative or additionally thereto, in the foregoing aspect, the plurality of seal shoes includes a plurality of shoe support slots configured to receive the plurality of shoe support tabs.

In the alternative or additionally thereto, in the foregoing aspect, each shoe support slot of the plurality of shoe support slots is disposed between a first circumferential side of a first seal shoe of the plurality of seal shoes and a second circumferential side of a second seal shoe, adjacent the first seal shoe, of the plurality of seal shoes.

In the alternative or additionally thereto, in the foregoing aspect, the shoe support plate includes a plurality of recesses corresponding to the plurality of seal shoes.

In the alternative or additionally thereto, in the foregoing aspect, each recess of the plurality of recesses has a substantially scalloped shape.

In the alternative or additionally thereto, in the foregoing aspect, the stator structure further includes a seal carrier. The shoe support plate is mounted to the seal carrier of the stator structure.

In the alternative or additionally thereto, in the foregoing aspect, the seal carrier includes a seal carrier surface and the shoe support plate is mounted to the seal carrier by a press-fit connection between the shoe support plate and the seal carrier surface.

In the alternative or additionally thereto, in the foregoing aspect, the plurality of shoe support tabs of the shoe support plate are configured to support the plurality of seal shoes in at least one of a radial and a circumferential direction.

In the alternative or additionally thereto, in the foregoing aspect, the outer seal structure further includes a ring structure axially engaged with the seal base and one or more secondary seal devices mounted with the ring structure and configured to substantially seal an annular gap between the ring structure and the plurality of seal shoes.

In the alternative or additionally thereto, in the foregoing aspect, each spring element of the plurality of spring elements includes a first mount connected to the respective seal shoe of the plurality of seal shoes and a second mount connected to the seal base.

In the alternative or additionally thereto, in the foregoing aspect, each spring element of the plurality of spring elements further includes one or more spring beams extending from the first mount to the second mount.

According to another aspect of the present disclosure, an outer seal structure for a rotor assembly includes a stator structure and a non-contact seal assembly. The non-contact seal assembly is fixed relative to the stator structure. The non-contact seal assembly includes a plurality of seal shoes, a seal base, a plurality of spring elements, and a shoe support plate. The plurality of seal shoes are arranged about an axis in an annular array. The plurality of seal shoes include a plurality of shoe support slots. Each shoe support slot of the plurality of shoe support slots is disposed between a first circumferential side of a first seal shoe of the plurality of seal shoes and a second circumferential side of a second seal shoe, adjacent the first seal shoe, of the plurality of seal shoes. The seal base circumscribes the annular array of the plurality of seal shoes. Each of the plurality of spring elements extends radially between a respective seal shoe of the plurality of seal shoes and the seal base. The shoe support plate is arranged about the axis and mounted to the stator structure. The shoe support plate includes a plurality of shoe support tabs extending axially from the shoe support plate. Each shoe support tab of the plurality of shoe support tabs is disposed within each shoe support slot of the plurality of shoe support slots.

In the alternative or additionally thereto, in the foregoing aspect, the shoe support plate includes a plurality of recesses corresponding to the plurality of seal shoes.

In the alternative or additionally thereto, in the foregoing aspect, each recess of the plurality of recesses has a substantially scalloped shape.

In the alternative or additionally thereto, in the foregoing aspect, the stator structure further includes a seal carrier. The shoe support plate is mounted to the seal carrier of the stator structure.

In the alternative or additionally thereto, in the foregoing aspect, the plurality of shoe supports tabs of the shoe support plate are configured to support the plurality of seal shoes in at least one of a radial and a circumferential direction.

According to another aspect of the present disclosure, an outer seal structure for a rotor assembly includes a stator structure and a non-contact seal assembly. The non-contact seal assembly is fixed relative to the stator structure. The non-contact seal assembly includes a plurality of seal shoes, a seal base, a plurality of spring elements, and a shoe support plate. The plurality of seal shoes are arranged about an axis in an annular array. The seal base circumscribes the annular array of the plurality of seal shoes. Each spring element of the plurality of spring elements extends radially between a respective seal shoe of the plurality of seal shoes and the seal base. The shoe support plate is arranged about the axis and mounted to the stator structure. The shoe support plate includes a plurality of shoe support tabs extending axially from the shoe support plate. Each shoe support tab of the plurality of shoe support tabs is disposed between each adjacent pair of seal shoes of the plurality of seal shoes. The plurality of shoe support tabs of the shoe support plate are configured to support the plurality of seal shoes in at least one of a radial and a circumferential direction.

In the alternative or additionally thereto, in the foregoing aspect, the plurality of seal shoes includes a plurality of shoe support slots configured to receive the plurality of shoe support tabs.

In the alternative or additionally thereto, in the foregoing aspect, each shoe support slot of the plurality of shoe support slots is disposed between a first circumferential side of a first seal shoe of the plurality of seal shoes and a second circumferential side of a second seal shoe, adjacent the first seal shoe, of the plurality of seal shoes.

In the alternative or additionally thereto, in the foregoing aspect, the shoe support plate includes a plurality of recesses corresponding to the plurality of seal shoes.

The present disclosure, and all its aspects, embodiments and advantages associated therewith will become more readily apparent in view of the detailed description provided below, including the accompanying drawings.

DETAILED DESCRIPTION

Figure 1:
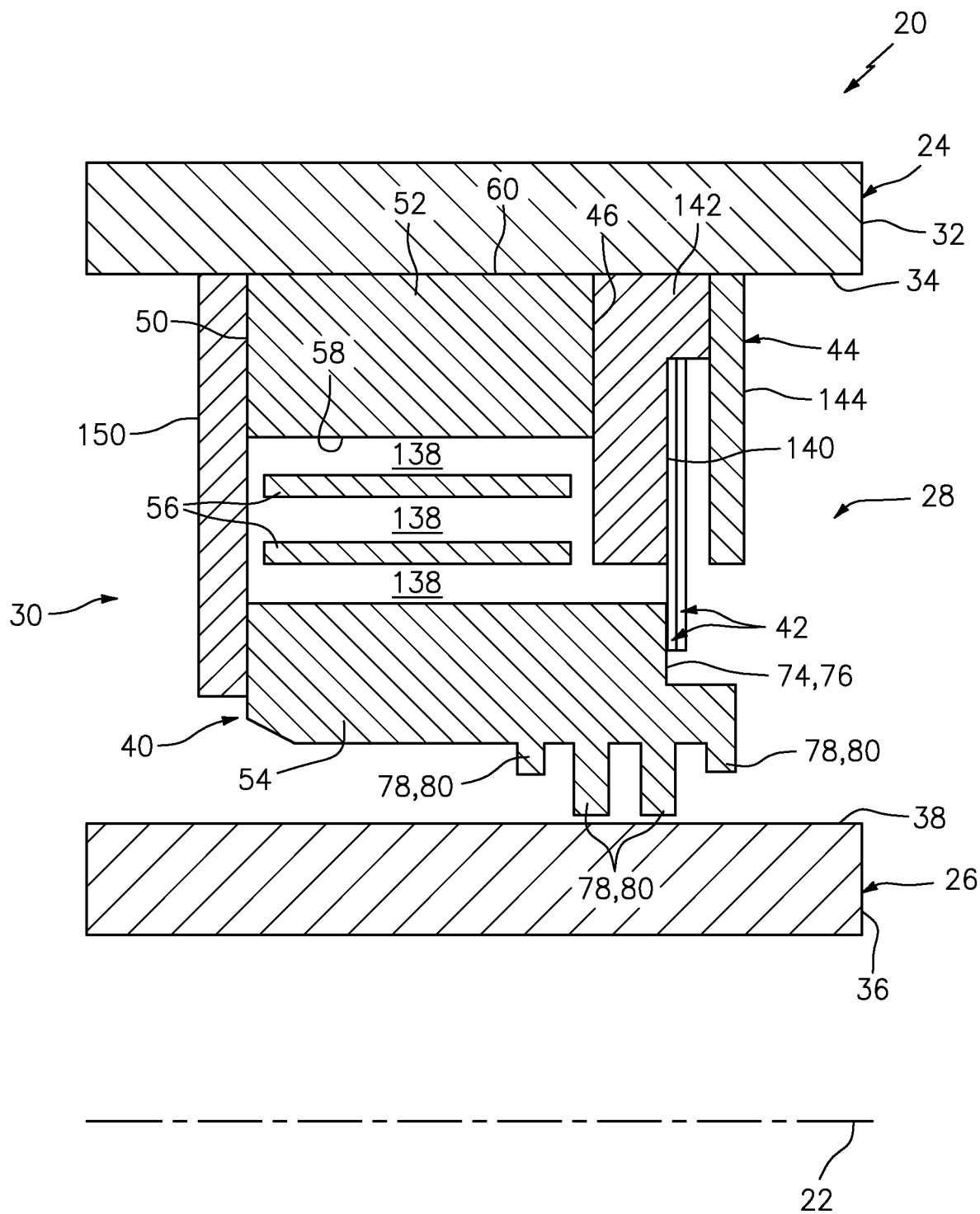
FIG. 1 is a top-half, side-section illustration of an assembly for an item of rotational equipment with a rotational axis.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

FIG. 1 illustrates an assembly 20 for an item of rotational equipment with a rotational axis 22. An example of such an item of rotational equipment is a gas turbine engine for an aircraft propulsion system. However, the assembly 20 of the present disclosure is not limited to such an aircraft or gas turbine engine application. The assembly 20, for example, may alternatively be configured with rotational equipment such as an industrial gas turbine engine, a wind turbine, a water turbine, or any other apparatus in which a seal is provided between a stator structure and a rotor structure.

The assembly 20 of FIG. 1 includes a stator structure 24, a rotor structure 26, and a seal assembly 28, which is fixed relative to the stator structure 24. This seal assembly 28 is mounted with the stator structure 24 and configured to substantially seal an annular gap 30 between the stator structure 24 and the rotor structure 26 as described below in further detail.

The stator structure 24 includes a seal carrier 32. This seal carrier 32 may be a discrete, unitary annular body. Alternatively, the seal carrier 32 may be configured with another component/portion of the stator structure 24. The seal carrier 32 has an inner radial seal carrier surface 34. This seal carrier surface 34 may be substantially cylindrical and extends circumferentially around and faces towards the rotational axis 22. The seal carrier surface 34 at least partially forms a bore in the stator structure 24. This bore is sized to receive the seal assembly 28, which may be fixedly attached to the seal carrier 32 by, for example, a press fit connection between the seal assembly 28 and the seal carrier surface 34. The seal assembly 28, of course, may also or alternatively be fixedly attached to the seal carrier 32 using one or more other techniques/devices.

The rotor structure 26 includes a seal land 36. This seal land 36 may be a discrete, unitary annular body. Alternatively, the seal land 36 may be configured with another component/portion of the rotor structure 26. The seal land 36 has an outer radial seal land surface 38. This seal land surface 38 may be substantially cylindrical and extends circumferentially around and faces away from the rotational axis 22. The seal land surface 38 is disposed to face towards and is radially aligned with the seal carrier surface 34. While FIG. 1 illustrates the surfaces 34 and 38 with approximately equal axial lengths along the rotational axis 22, the axial length of the seal land surface 38 may alternatively be longer or shorter than the seal carrier surface 34 in other embodiments.

The seal assembly 28 includes a primary seal device 40 and one or more secondary seal devices 42 (e.g., 1, 2, 3, or more secondary seal devices 42). The seal assembly 28 also includes one or more additional components for positioning, supporting, and/or mounting one or more of the seal devices with the stator structure 24. The seal assembly 28 of FIG. 1, for example, includes a first ring structure 44 configured for positioning, supporting, and/or mounting the secondary seal devices 42 relative to the primary seal device 40. This first ring structure 44 may also be configured for axially positioning and/or supporting a second end surface 46 of the primary seal device 40 relative to the stator structure 24. As described below in further detail, the seal assembly 28 of FIG. 1 also includes a shoe support plate 150 configured for positioning and/or supporting the primary seal device 40 relative to the stator structure 24.

Figure 3:
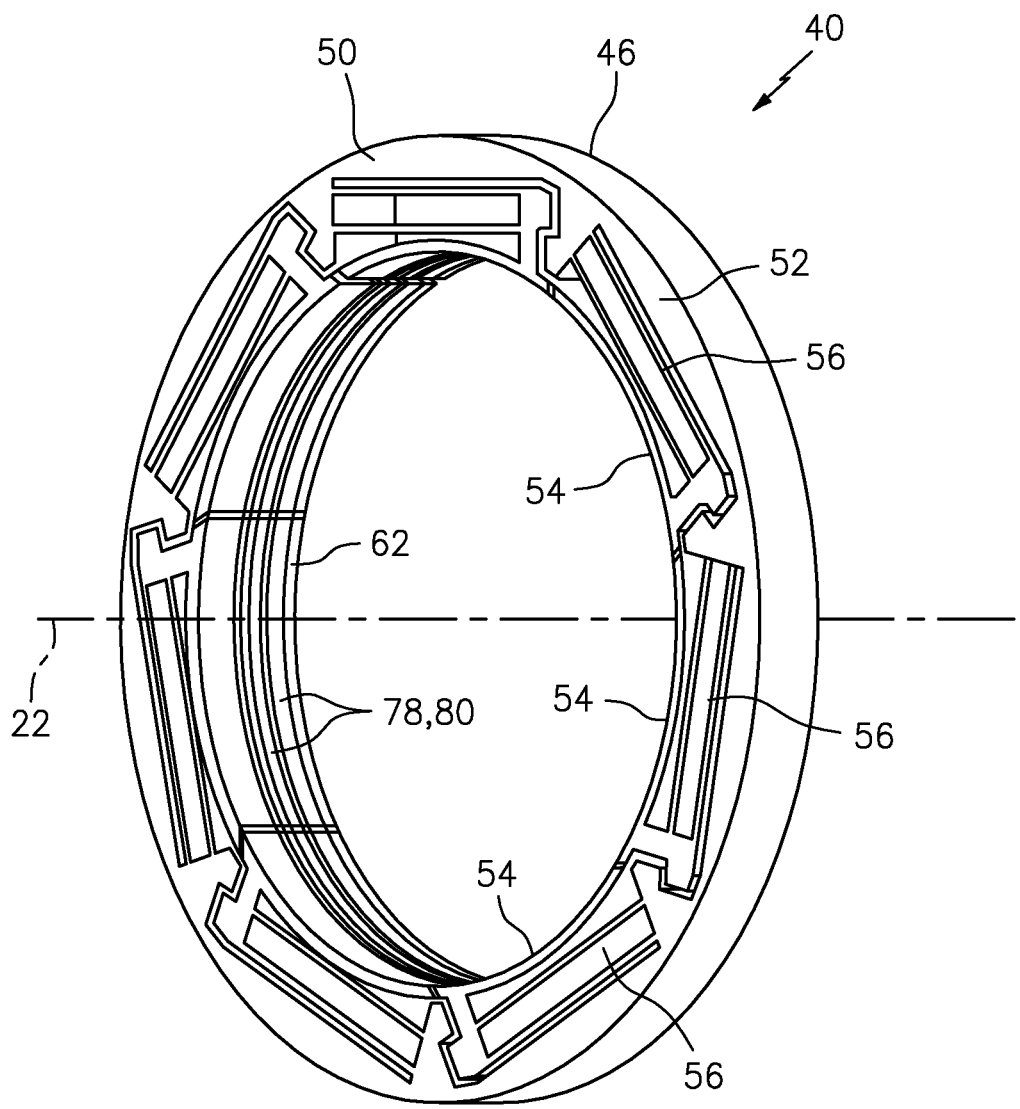
FIG. 3 is a cutaway, perspective illustration of an exemplary primary seal device.

Referring to FIG. 3, the primary seal device 40 is configured as an annular non-contact seal device and, more particularly, a hydrostatic non-contact seal device. An example of such a hydrostatic non-contact seal device is a HALO™ type seal; however, the primary seal device 40 of the present disclosure is not limited to the foregoing exemplary hydrostatic non-contact seal device.

Figure 2:
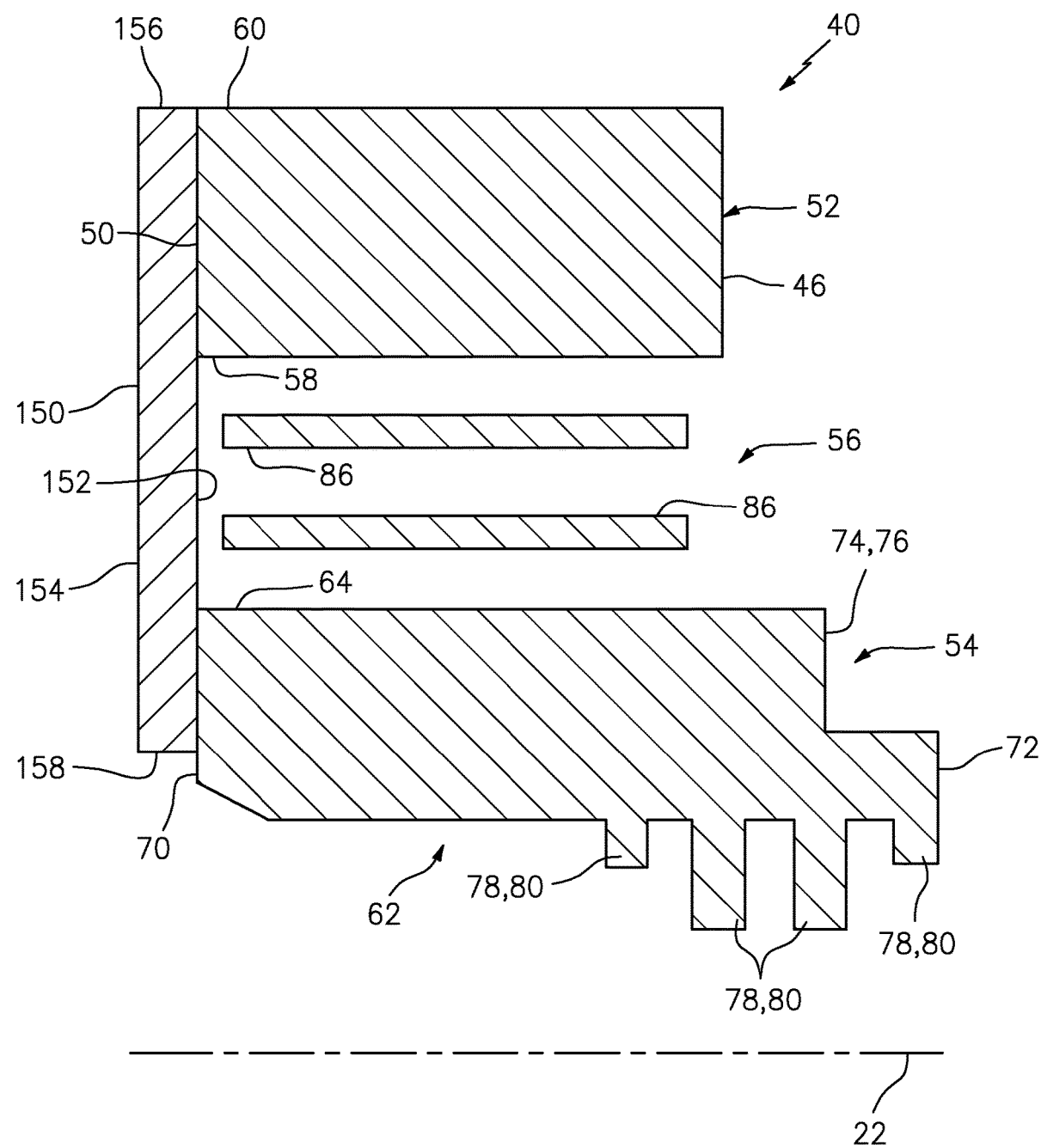
FIG. 2 is a top-half, side-sectional illustration of a primary seal device.
Figure 5:
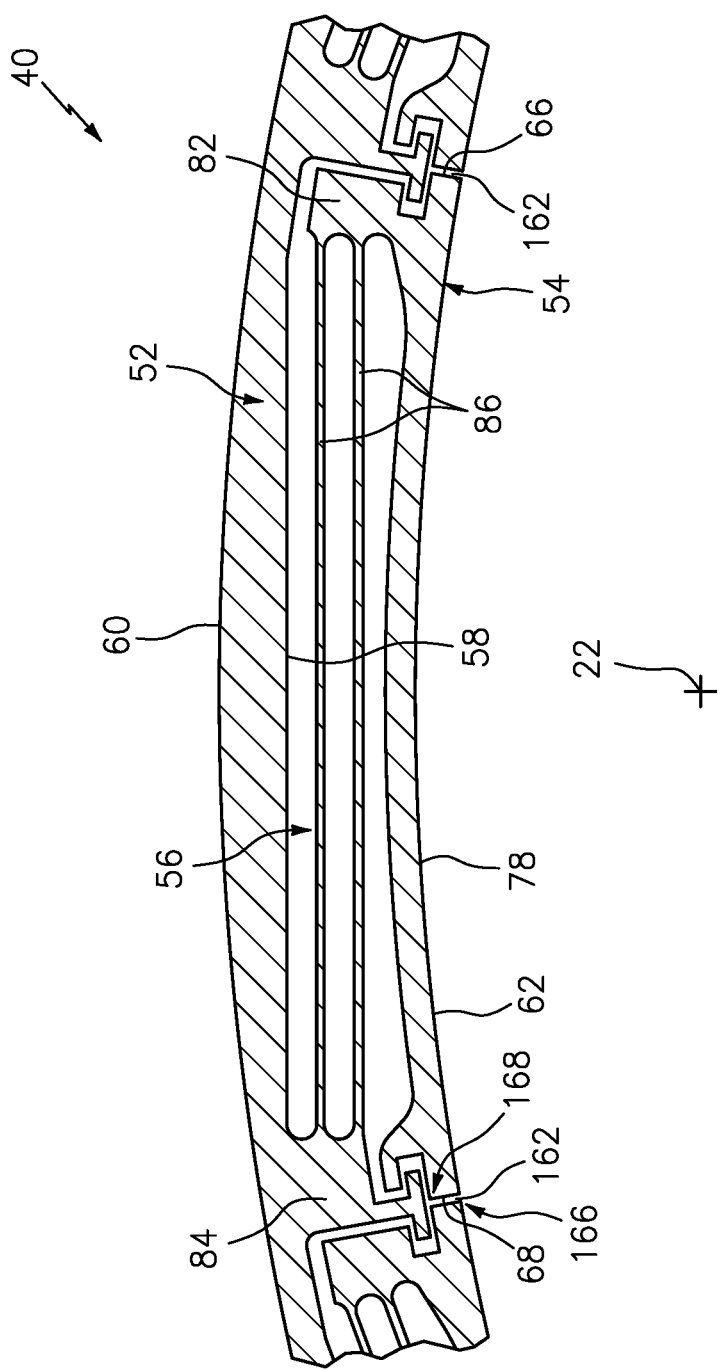
FIG. 5 is a partial, cutaway illustration of the primary seal device of FIG. 3.
Figure 6:
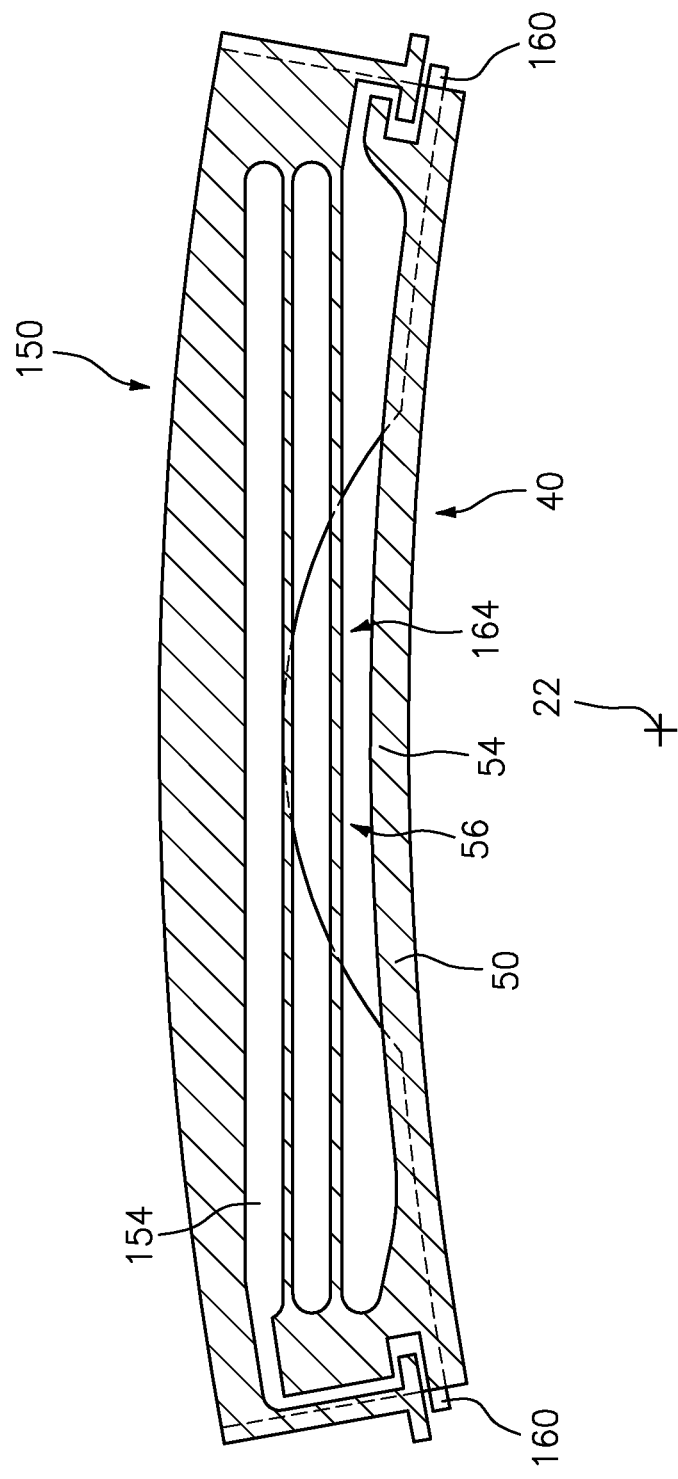
FIG. 6 is a partial, cross-sectional illustration of the primary seal device of FIG. 3.

Referring to FIGS. 1, 2, and 5, the primary seal device 40 includes a seal base 52, a plurality of seal shoes 54, and a plurality of spring elements 56. The seal base 52 is configured as an annular full hoop body, which extends circumferentially around the rotational axis 22. The seal base 52 is configured to circumscribe the plurality of seal shoes 54 as well as the plurality of spring elements 56. The seal base 52 extends axially along the rotational axis 22 between and joins the second end surface 46 and a first end surface 50 of the primary seal device 40. The seal base 52 extends radially between an inner radial base side 58 and an outer radial base side 60. The outer radial base side 60 radially engages (e.g., is press fit against) the stator structure 24 and, more particularly, the seal carrier surface 34 (see FIG. 1).

Referring to FIG. 3, the plurality of seal shoes 54 are configured as arcuate bodies arranged circumferentially about the rotational axis 22 in an annular array. This annular array of the seal shoes 54 extends circumferentially around the rotational axis 22, thereby forming an inner bore at an inner radial side 62 of the primary seal device 40. As best seen in FIG. 1, the inner bore is sized to receive the seal land 36, where the rotor structure projects axially through (or into) the inner bore formed by the plurality of seal shoes 54.

Referring to FIGS. 1 and 2, each of the seal shoes 54 extends radially from the inner radial side 62 of the primary seal device 40 to an outer radial surface 64 of that seal shoe 54. Each of the seal shoes 54 extends circumferentially around the rotational axis 22 between opposing first and second circumferential sides 66, 68 of that seal shoe 54.

Each of the seal shoes 54 extends axially along the rotational axis 22 between a first shoe end 70 and a second shoe end 72. The first shoe end 70 may be axially offset from and project axially away from the first end surface 50. The second shoe end 72 may be axially offset from and project axially away from the second end surface 46. The plurality of seal shoes 54 of the present disclosure, however, are not limited to such exemplary relationships.

Each of the seal shoes 54 includes end surfaces 74 generally at (e.g., on, adjacent, or proximate) the second shoe end 72. In the array (see FIG. 3), these end surfaces 74 collectively form a generally annular (but circumferentially segmented) end surface 76 configured for sealingly engaging with the secondary seal devices 42 (see FIG. 1). The plurality of seal shoes 54 of the present disclosure, however, are not limited to the foregoing exemplary configuration.

Referring to FIGS. 1-3 and 5, each of the seal shoes 54 includes one or more arcuate protrusions 78, which collectively form one or more (e.g., a plurality of axially spaced) generally annular (e.g., circumferentially segmented) ribs 80 at the inner radial side 62. Distal inner radial ends of one or more of these ribs 80 are configured to be arranged in close proximity with (but not touch) and thereby sealingly engage the seal land surface 38 in a non-contact manner (see FIG. 1), where the rotor structure 26 projects axially through (or into) the inner bore formed by the plurality of seal shoes 54.

The ribs 80 therefore are configured, generally speaking, as non-contact knife edge seal elements.

Referring to FIG. 3, the plurality of spring elements 56 are arranged circumferentially, in segments, about the rotational axis 22 in an annular array. Referring again to FIGS. 2 and 5, the plurality of spring elements 56 are also arranged radially between the plurality of seal shoes 54 and the seal base 52. Each of the spring elements 56 is configured to connect a respective one of the seal shoes 54 with the seal base 52.

The plurality of spring element 56 shown in FIG. 5 includes first and second mounts 82, 84 (e.g., generally radial fingers/projections) and one or more spring beams 86 (e.g., cantilever-leaf springs). The first mount 82 is connected to a respective one of the seal shoes 54 at (e.g., on, adjacent, or proximate) the first circumferential side 66, where the opposing second circumferential side 68 of that seal shoe 54 is free floating. The second mount 84 is connected to the seal base 52 and is generally circumferentially aligned with or near the second circumferential side 68.

The one or more spring beams 86 are radially stacked and spaced apart with one another. Each of these spring beams 86 extends laterally (e.g., tangentially or circumferentially relative to the rotational axis 22) between and is connected to the first mount 82 and the second mount 84. The one or more spring beams 86 may thereby laterally overlap a major circumferential portion (e.g., ~65-95%) of the respective seal shoe 54. The one or more spring beams 86 of the present disclosure, however, are not limited to the foregoing exemplary configuration or values.

Referring to FIGS. 2 and 4-6, the shoe support plate 150 may be configured as an annular full hoop body, which is mounted to the stator structure 24, for example the seal carrier 32, and extends circumferentially around the rotational axis 22. In some embodiments, the shoe support plate 150 may consist of a plurality of segments extending circumferentially about the rotational axis 22 in an annular array. The shoe support plate 150 includes a first support surface 152 and a second support surface 154 opposite the first support surface 152. The shoe support plate 150 also includes a first support end 156 and a second support end 158 opposite the first support end 156. The first support end 156 of the shoe support plate 150 radially engages (e.g., is press fit against) the stator structure 24 and, for example, the first support end 156 of the shoe support plate may be press fit against the seal carrier surface 34 of the seal carrier 32. The shoe support plate, of course, may also or alternatively be fixedly attached to the seal carrier 32 using one or more other techniques/devices. The first support surface 152 of the shoe support plate 150 abuts the first shoe end 70 of the plurality of seal shoes 54.

The shoe support plate 150 further includes a plurality of shoe support tabs 160 extending axially from the first support surface 152 of the shoe support plate 150. Each shoe support tab of the plurality of shoe support tabs 160 is disposed between each adjacent pair of seal shoes of the plurality of seal shoes 54. Each of the plurality of shoe support tabs 160 contacts at least one of the adjacent seal shoes of the plurality of seal shoes 54 thereby supporting the plurality of seal shoes 54 by, for example, extending structural support from the seal carrier 32 to the plurality of seal shoes 54. The plurality of shoe support tabs 160 may provide radial support/guidance of the plurality of seal shoes 54 during sealing operations by, for example, minimizing imbalance or rocking of the plurality of seal shoes 54 from the first circumferential side 66 to the second circumferential side 68. The plurality of shoe support tabs 160 may also provide circumferential support of the plurality of seal shoes 54, to reduce the likelihood of buckling in the spring beams 86. The plurality of seal shoes 54 may include a plurality of shoe support slots 162 configured to receive the respective plurality of shoe support tabs 160. Each shoe support slot of the plurality of shoe support slots 162 may be disposed, for example, between the first circumferential side 66 of a first seal shoe of the plurality of seal shoes 54 and the second circumferential side 68 of a second, adjacent, seal shoe of the plurality of seal shoes 54. Further, each shoe support slot of the plurality of shoe support slots 162 may extend radially between an inner radial slot end 166 and an outer radial slot end 168.

Figure 4:
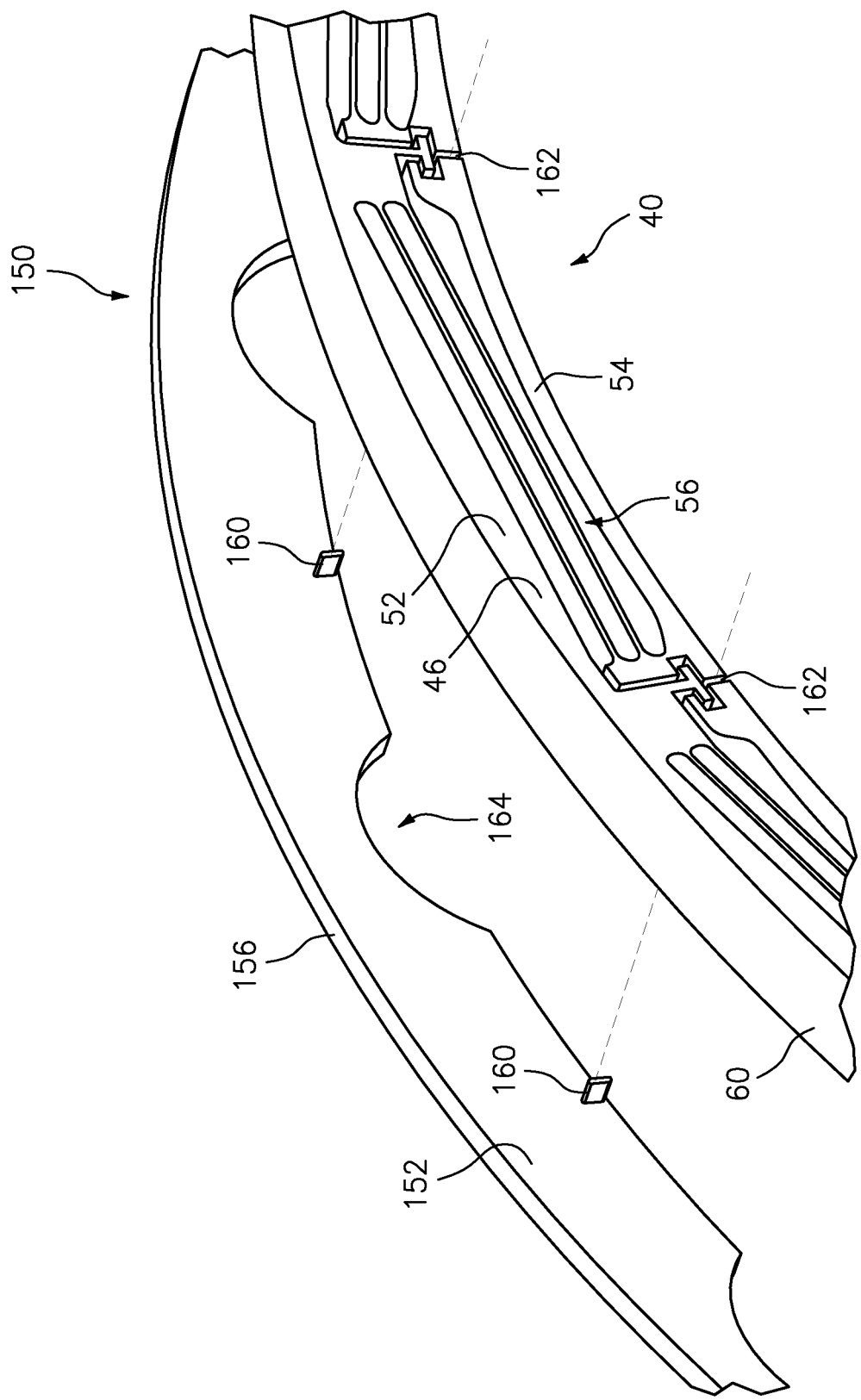
FIG. 4 is a partial, exploded illustration of the primary seal device of FIG. 3.

Referring to FIGS. 4 and 5, the shoe support plate 150 includes a plurality of recesses 164 corresponding to the respective plurality of seal shoes 54. Each recess of the plurality of recesses 164 may be generally scalloped in shape or may be alternatively shaped as appropriate to permit fluid flow into the plurality of shoe seals 54 in the axial direction.

Referring to FIG. 1, during operation of the primary seal device 40, rotation of the rotor structure 26 may develop aerodynamic forces and apply a fluid pressure to the plurality of seal shoes 54 causing each seal shoe 54 to respectively move radially relative to the seal land surface 38 with seal shoe 54 deflection guided by the seal support plate 150 (e.g., motion of the first and second circumferential sides 66, 68 of the seal shoe 54 with respect to one another). The fluid velocity may increase as a gap between the seal shoe 54 and seal land surface 38 increases, thus reducing pressure in the gap and drawing the seal shoe 54 radially inwardly toward the seal land surface 38. As the gap closes, the velocity may decrease, and the pressure may increase within the gap, thus forcing the seal shoe 54 radially outwardly from the seal land surface 38. The respective spring element 56 may deflect and move with the seal shoe 54 to create a primary seal of the gap between the seal land surface 38 and ribs 80 within predetermined design tolerances.

While the primary seal device 40 is operable to generally seal the annular gap 30 between the stator structure 24 and the rotor structure 26 as described above, fluid (e.g., gas) may still flow axially through passages 138 defined by radial gaps between the components 54, 56, and 58. The secondary seal devices 42, therefore, are provided to seal off these passages 138 and, thereby, further and more completely seal the annular gap.

Each of the secondary seal devices 42 may be configured as a ring seal element such as, but not limited to, a split ring. Alternatively, one or more of the secondary seal devices 42 may be configured as a full hoop body ring, an annular brush seal or any other suitable ring-type seal.

The secondary seal devices 42 of FIG. 1 are arranged together in an axial stack. In this stack, each of the secondary seal devices 42 axially engages (e.g., contacts) another adjacent one of the secondary seal devices 42. The stack of the secondary seal devices 42 is arranged with the first ring structure 44, which positions and mounts the secondary seal devices 42 with the stator structure 24 adjacent the primary seal device 40. In this arrangement, the stack of the secondary seal devices 42 is operable to axially engage and form a seal between the end surface 76 of the plurality of seal shoes 54 and an annular surface 140 of the first ring structure 44. These surfaces 76, 140 are axially aligned with one another, which enables the stack of the secondary seal devices 42 to slide radially against, but maintain sealingly engaged with, the end surface 76 as the plurality of seal shoes 54 move radially relative to the seal land surface 38 as described above. Of course, in other embodiments, the surfaces 76, 140 may be misaligned where the secondary seal devices 42 are correspondingly configured.

The first ring structure 44 may include a secondary seal device support ring 142 and a retention ring 144. The support ring 142 is configured with an annular full hoop body, which extends circumferentially around the rotational axis 22. The support ring 142 includes the annular surface 140 and is disposed axially adjacent and engaged with the seal base 52.

The retention ring 144 is configured with an annular full hoop body, which extends circumferentially around the rotational axis 22. The retention ring 144 is disposed axially adjacent and engaged with the support ring 142, thereby capturing the stack of the secondary seal devices 42 within an annular channel formed between the rings 142, 144. The stack of the secondary seal devices 42, of course, may also or alternatively be attached to one of the rings by, for example, a press fit connection and/or one or more other techniques/devices.

The present disclosure is not limited to the exemplary primary seal device 40 type or configuration described above. Various other non-contact seals are known in the art and may be reconfigured in light of the disclosure above to be included with the assembly 20 of the present disclosure. Other examples of non-contact seals are disclosed in U.S. Pat. Nos. 8,172,232; 8,002,285; 7,896,352; 7,410,173; 7,182,345; and 6,428,009, each of which is hereby incorporated herein by reference in its entirety.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. An outer seal structure for a rotor assembly comprising:
a seal carrier; and
a non-contact seal assembly, fixed relative to the seal carrier, the non-contact seal assembly comprising:
 a plurality of seal shoes arranged about an axis in an annular array, the plurality of seal shoes comprising a plurality of shoe support slots;
 a seal base circumscribing the annular array of the plurality of seal shoes;
 a plurality of spring elements, each of the plurality of spring elements extending radially between a respective seal shoe of the plurality of seal shoes and the seal base; and
 a shoe support plate arranged about the axis and mounted to the seal carrier, the shoe support plate comprising a radially-extending support surface which faces the plurality of seal shoes and a plurality of shoe support tabs extending axially from an inner radial portion of the radially-extending support surface;
wherein a shoe support tab of the plurality of shoe support tabs is disposed in a respective shoe support slot of the plurality of shoe support slots between each adjacent pair of seal shoes of the plurality of seal shoes.

2. The structure of claim 1, wherein each shoe support slot of the plurality of shoe support slots is disposed between a first circumferential side of a first seal shoe of the plurality of seal shoes and a second circumferential side of a second seal shoe, adjacent the first seal shoe, of the plurality of seal shoes.

3. The structure of claim 1, wherein the shoe support plate includes a plurality of recesses corresponding to the plurality of seal shoes.

4. The structure of claim 3, wherein each recess of the plurality of recesses has a substantially scalloped shape.

5. The structure of claim 1, wherein the seal carrier comprises a seal carrier surface and the shoe support plate is mounted to the seal carrier by a press-fit connection between the shoe support plate and the seal carrier surface.

6. The structure of claim 1, wherein the plurality of shoe support tabs of the shoe support plate are configured to support the plurality of seal shoes in at least one of a radial and a circumferential direction.

7. The structure of claim 1, further comprising:
a ring structure axially engaged with the seal base; and
one or more secondary seal devices mounted with the ring structure and configured to substantially seal an annular gap between the ring structure and the plurality of seal shoes.

8. The structure of claim 1, wherein each spring element of the plurality of spring elements comprises:
a first mount connected to the respective seal shoe of the plurality of seal shoes; and
a second mount connected to the seal base.

9. The structure of claim 8, wherein each spring element of the plurality of spring elements further comprises one or more spring beams extending from the first mount to the second mount.

10. An outer seal structure for a rotor assembly comprising:
a seal carrier; and
a non-contact seal assembly, fixed relative to the seal carrier, the non-contact seal assembly comprising:
a plurality of seal shoes arranged about an axis in an annular array, the plurality of seal shoes comprising a plurality of shoe support slots, each shoe support slot of the plurality of shoe support slots disposed between a first circumferential side of a first seal shoe of the plurality of seal shoes and a second circumferential side of a second seal shoe, adjacent the first seal shoe, of the plurality of seal shoes;
a seal base circumscribing the annular array of the plurality of seal shoes;
a plurality of spring elements, each of the plurality of spring elements extending radially between a respective seal shoe of the plurality of seal shoes and the seal base; and
a shoe support plate arranged about the axis and mounted to the seal carrier, the shoe support plate comprising a radially-extending support surface which faces the plurality of seal shoes and a plurality of shoe support tabs extending axially from an inner radial portion of the radially-extending support surface;
wherein a shoe support tab of the plurality of shoe support tabs is disposed within a respective shoe support slot of the plurality of shoe support slots.

11. The structure of claim 10, wherein the shoe support plate includes a plurality of recesses corresponding to the plurality of seal shoes.

12. The structure of claim 11, wherein each recess of the plurality of recesses has a substantially scalloped shape.

13. The structure of claim 10, wherein the plurality of shoe support tabs of the shoe support plate are configured to support the plurality of seal shoes in at least one of a radial and a circumferential direction.

14. An outer seal structure for a rotor assembly comprising:
a seal carrier; and
a non-contact seal assembly, fixed relative to the seal carrier, the non-contact seal assembly comprising:
a plurality of seal shoes arranged about an axis in an annular array, the plurality of seal shoes comprising a plurality of shoe support slots;
a seal base circumscribing the annular array of the plurality of seal shoes;
a plurality of spring elements, each of the plurality of spring elements extending radially between a respective seal shoe of the plurality of seal shoes and the seal base; and
a shoe support plate arranged about the axis and mounted to the seal carrier, the shoe support plate comprising a radially-extending support surface which faces the plurality of seal shoes and a plurality of shoe support tabs extending axially from an inner radial portion of the radially-extending support surface;
wherein a shoe support tab of the plurality of shoe support tabs is disposed in a respective shoe support slot of the plurality of shoe support slots between each adjacent pair of seal shoes of the plurality of seal shoes; and
wherein the plurality of shoe support tabs of the shoe support plate are configured to support the plurality of seal shoes in at least one of a radial and a circumferential direction.

15. The structure of claim 14, wherein each shoe support slot of the plurality of shoe support slots is disposed between a first circumferential side of a first seal shoe of the plurality of seal shoes and a second circumferential side of a second seal shoe, adjacent the first seal shoe, of the plurality of seal shoes.

16. The structure of claim 14, wherein the shoe support plate includes a plurality of recesses corresponding to the plurality of seal shoes.

17. The structure of claim 1, wherein each shoe support slot of the plurality of shoe support slots extends radially between an inner radial slot end and an outer radial slot end.

18. The structure of claim 1, wherein each shoe support tab of the plurality of shoe support tabs contacts a respective at least one seal shoe of the adjacent pair of seal shoes.

19. The structure of claim 1, wherein the plurality of shoe support tabs are configured to radially guide the plurality of seal shoes.

* * * * *